US007864763B2

(12) United States Patent
Yi

(10) Patent No.: US 7,864,763 B2
(45) Date of Patent: Jan. 4, 2011

(54) METHOD AND DEVICE FOR IMPLEMENTING LAYER 1 VIRTUAL PRIVATE NETWORK

(75) Inventor: Qiliang Yi, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 167 days.

(21) Appl. No.: 12/028,313

(22) Filed: Feb. 8, 2008

(65) Prior Publication Data

US 2008/0181223 A1 Jul. 31, 2008

Related U.S. Application Data

(63) Continuation of application No. PCT/CN2007/070195, filed on Jun. 27, 2007.

(30) Foreign Application Priority Data

Sep. 13, 2006  (CN) .................. 2006 1 0062588

(51) Int. Cl.
*H04L 12/56* (2006.01)
*G06F 15/173* (2006.01)

(52) U.S. Cl. .................. 370/389; 370/401; 709/238
(58) Field of Classification Search ................ None
See application file for complete search history.

(56) References Cited

U.S. PATENT DOCUMENTS

| 7,379,457 B2* | 5/2008 | Brahim ................ 370/390 |
|---|---|---|
| 7,653,050 B2* | 1/2010 | Brahim ................ 370/353 |
| 7,680,934 B2* | 3/2010 | Aubin et al. .......... 709/226 |
| 2003/0228147 A1 | 12/2003 | Brahim ............... 398/50 |
| 2004/0151500 A1* | 8/2004 | Misawa et al. ........ 398/58 |
| 2004/0255028 A1 | 12/2004 | Chu et al. ............ 709/227 |
| 2005/0190757 A1* | 9/2005 | Sajassi ............... 370/389 |

(Continued)

FOREIGN PATENT DOCUMENTS

CN        1614968 A        5/2005

(Continued)

OTHER PUBLICATIONS

"Series Y: Global Information Infrastructure , Internet Protocol Aspects and Next Generation Networks: Layer 1 Virtual Private Network Generic Requirements and Architectures," International Telecommunication Union, Y.1312, Sep. 2003.

(Continued)

*Primary Examiner*—Pankaj Kumar
*Assistant Examiner*—Marcus R Smith
(74) *Attorney, Agent, or Firm*—Ladas & Parry, LLP

(57) ABSTRACT

A method for implementing Layer 1 Virtual Private Network (L1 VPN) includes creating on a Provider Edge (PE) at least one Virtual PE which performs signaling exchange and routing exchange with a Customer Edge (CE) to support at least one L1 VPN service mode. A device corresponding to the method is also provided. With the inventive solution, appropriate service modes may be selected according to different demands of a user for L1 VPN services required, and VPEs and VCEs may be created dynamically on a PE and a CE to support various service modes, so as to satisfy the demands of the user. Information security and effective resource usage can also be ensured in supporting the various service modes.

7 Claims, 5 Drawing Sheets

U.S. PATENT DOCUMENTS

| | | | |
|---|---|---|---|
| 2005/0195767 A1 | 9/2005 | Rahman | 370/331 |
| 2005/0216590 A1* | 9/2005 | Aubin et al. | 709/226 |
| 2006/0136233 A1* | 6/2006 | Takeda et al. | 705/1 |
| 2006/0165087 A1* | 7/2006 | Page et al. | 370/395.3 |
| 2007/0140250 A1* | 6/2007 | McAllister et al. | 370/392 |

FOREIGN PATENT DOCUMENTS

| | | |
|---|---|---|
| EP | 1392033 A | 2/2004 |
| EP | 1 580 939 A1 | 9/2005 |

OTHER PUBLICATIONS

Tomonori Takeda (Editor) NTT: "Frameworks and Requirements for Layer 1 Virtual Private Networks; draft-itef-11vpn-framework-04.txt," IETF Standard-Working-Draft, Internet Engineering Task Force, IETF, CH., vol. 11vpn, No. 4, Chapter 7, Sep. 1, 2006.

"Series Y: Global Information Infrastructure, Internet Protocol Aspects and Next Generation Networks," Internet Protocol Aspects, Layer 1 Virtual Private Network Service and Network service and network architectures, International Telecommunication Union (Jul. 2004).

Liu, G., et al., "A Virtual Router Architecture and Its Implementation," Computer Engineering, vol. 30, No. 11, pp., June 2004 (with abstract).

English-language translation of Written Opinion of the International Searching Authority issued in PCT Application No. PCT/CN2007/070195 on Oct. 18, 2007.

First Office Action issued in the priority Chinese Application No. CN 2006100625889 on Oct. 10, 2008, with its English-language translation.

Second Office Action issued in the priority Chinese Application No. CN 2006100625889 on Dec. 18, 2009, with its English language translation.

First Office Action issued in the corresponding EPO Patent Application No. 07 721 805.5 on Feb. 25, 2010.

* cited by examiner

METHOD AND DEVICE FOR IMPLEMENTING LAYER 1 VIRTUAL PRIVATE NETWORK

CROSS-REFERENCES TO RELATED APPLICATIONS

The present application is a continuation of PCT Application No. PCT/CN2007/070195, filed on Jun. 27, 2007, which claims the priority to Chinese patent application No. 200610062588.9, entitled "Method and device for implementing Layer 1 Virtual Private Network" and filed with the Chinese Patent Office on Sep. 13, 2006. All of these applications are incorporated herein by reference in its entirety for all purposes.

FIELD OF THE INVENTION

The present invention relates to the field of network communication technologies and in particular to a method and device for implementing a Virtual Private Network.

BACKGROUND OF THE INVENTION

Optical Virtual Private Network (OVPN) is a new service application emerging during transition of an optical network to Automatically Switched Optical Network (ASON). The OVPN provides users with a Virtual Private Network (VPN) service at a transport layer, and is also referred to as Layer 1 VPN (L1 VPN). An OVPN service, just like a conventional VPN service, enables users to build flexibly their own network topologies with a reduced communication cost within a public network, and allows a carrier to divide physical network resources so that end users are capable of viewing and managing their respective OVPNs generally and safely as in the case that they each own their own optical networks. Also, the OVPN enables a carrier to optimize a utilization ratio of bandwidth, and thus gains more business opportunities with fewer investments to thereby increase its revenue.

Various service modes, including a Basic Mode and an Enhanced Mode, for implementing the L1 VPN are described in the draft-ietf-l1vpn-framework by the IETF. The Enhanced Mode further includes an enhanced Overlay Mode, a Virtual Node mode, a Virtual Link mode, a Per VPN Peer mode, etc. Information exchanged between a Customer Edge (CE) and a Provider Edge (PE) and signaling routing approaches of the CE and the PE may vary from one mode to another.

Further, different modes correspond to different service scenarios. In scenarios of Multi-service Backbone, Carrier's carrier, etc., for example, dedicated resources are likely to be allocated to a user, and the user can monitor the performance of a dedicated circuit in a network of the carrier, here, the Virtual Link or Per VPN Peer mode may be used. In scenarios of Video Conference, Content Distribution, etc., link resources of a carrier are shared among respective VPNs, the Basic Mode may be used. Different users may have different demands for scenarios, and a carrier needs to be capable of supporting all scenarios required by the users. In other words, the carrier is required to be capable of supporting various service modes and hence supporting the different demands for scenarios.

SUMMARY OF THE INVENTION

A method for implementing a Layer 1 Virtual Private Network according to an embodiment of the invention includes creating on a Provider Edge at least one Virtual PE which performs signaling exchange and routing exchange with a Customer Edge to support at least one L1 VPN service mode.

The method for implementing the Layer-1 Virtual Private Network according to the embodiment of the invention further includes:

creating on the Customer Edge at least one Virtual CE which performs signaling exchange and routing exchange with the at least one Virtual PE to support at least one L1 VPN service mode.

An embodiment of the invention provides a Provider Edge for implementing a Layer 1 Virtual Private Network, including a VPN common processing module, at least one Virtual PE, a memory and a Central Processing Unit, in which:

the VPN common processing module is adapted to implement common functions for at least one L1 VPN service mode on a PE, and create or delete the at least one Virtual PE corresponding to the at least one L1 VPN service mode;

the memory is adapted to store member information of the at least one L1 VPN service mode;

the Central Processing Unit is adapted to interact with the VPN common processing module according to the member information stored in the memory to support the at least one L1 VPN service mode.

An embodiment of the invention also provides a Customer Edge for implementing a Layer 1 Virtual Private Network, including a VPN common processing module, at least one Virtual CE, a memory and a Central Processing Unit, in which:

the VPN common processing module is adapted to implement common functions for at least one VPN service mode on a CE, and create or delete the at least one Virtual CE corresponding to the at least one L1 VPN service mode;

the memory is adapted to store member information of the at least one L1 VPN service mode;

the Central Processing Unit is adapted to interact with the VPN common processing module according to the member information stored in the memory to support the at least one L1 VPN service mode.

In the solutions according to the embodiments of the invention, one or more L1 VPN service modes are created according to demands of a user for L1 VPN application scenarios, appropriate service modes may be selected according to different demands of the user for L1 VPN services, and VPEs and VCEs may be created dynamically on a PE and a CE to support the one or more service modes, so as to satisfy demands of various users for the L1 VPN application in different scenarios. Information of the VCE and the VPE of a VPN is isolated from that of the VCE and the VPE of a different VPN, therefore, information security and effective resource usage can also be ensured in supporting the various service modes.

BRIEF DESCRIPTIONS OF THE DRAWINGS

DETAILED DESCRIPTIONS OF THE EMBODIMENTS

Detailed descriptions are given as follows in conjunction with the drawings and the embodiments.

Figure 1:
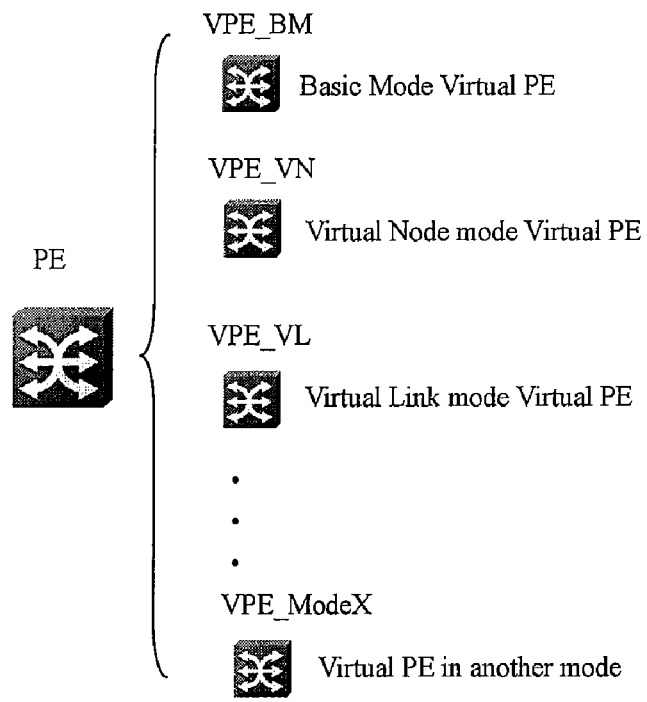
FIG. 1 is a schematic diagram of creating a plurality of VPEs on a physical PE according to an embodiment of the invention.

FIG. 1 illustrates a schematic diagram of creating a plurality of Virtual PEs on a physical PE. In an embodiment of the invention, a plurality of types of VPEs, such as a VPE supporting the Basic Mode (VPE_BM), a VPE supporting the Virtual Node mode (VPE_VN), a VPE supporting the Virtual Link mode (VPE_VL) or a VPE for another mode, can be created dynamically on a physical PE according to application scenarios of user VPNs and the number of the VPNs.

Figure 2:
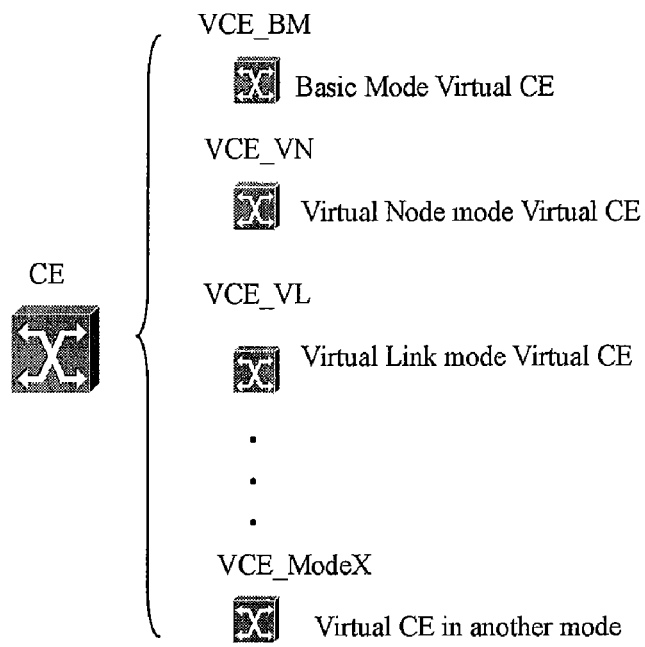
FIG. 2 is a schematic diagram of creating a plurality of VCEs on a physical CE according to an embodiment of the invention.

FIG. 2 illustrates a schematic diagram of creating a plurality of Virtual CEs on a physical CE. In an embodiment of the invention, a plurality of types of VCEs, such as a VCE supporting the Basic Mode (VCE_BM), a VCE supporting the Virtual Node mode (VCE_VN), a VCE supporting the Virtual Link mode (VCE_VL) or a VCE for another mode, can be created dynamically on a physical CE according to application scenarios of user VPNs and the number of the VPNs.

Figure 3:
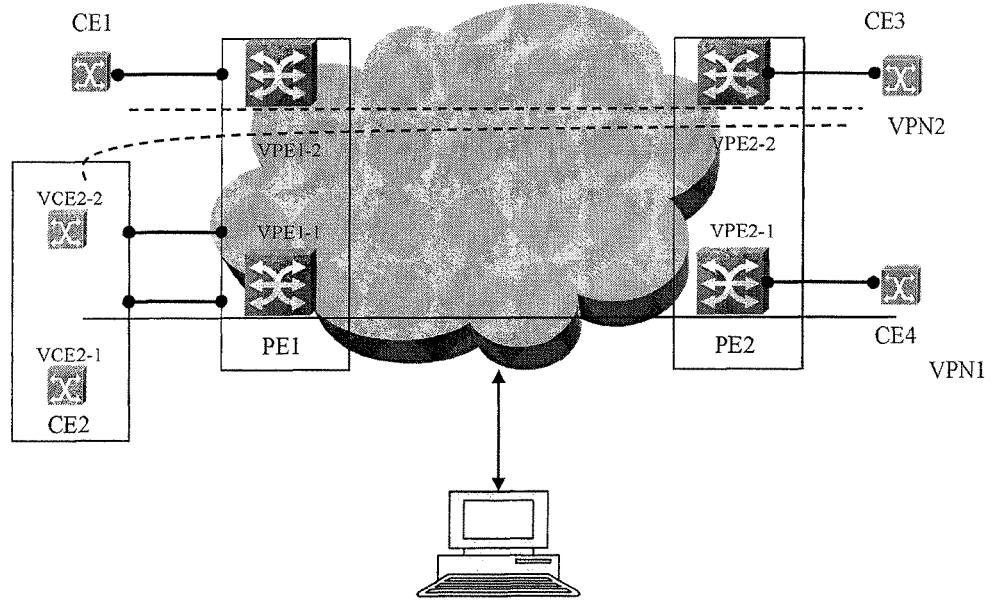
FIG. 3 is a schematic diagram of supporting a plurality of service modes according to an embodiment of the invention.

FIG. 3 is a schematic diagram of supporting a plurality of service modes according to an embodiment of the invention. Here, a VPN1 with dedicated links is set up between a CE2 and a CE4, and it is specified in a Service Level Agreement (SLA) with a user that the user can view information of the dedicated link, such as a performance alarm. Consequently, the Virtual Link mode shall be used to support the VPN1. The dedicated links are allocated to the VPN1 when the VPN is set up, and these links are exclusively used by the VPN1. A VPN2 for content distribution is set up among a CE1, the CE2 and a CE3, and is allocated with no dedicated link resource, where a communication link is requested and deleted dynamically. The VPN2 shall be supported through the Basic Mode. Both of the two service modes are supported through creating VPEs and VCEs according to different demands of the user.

Figure 4:
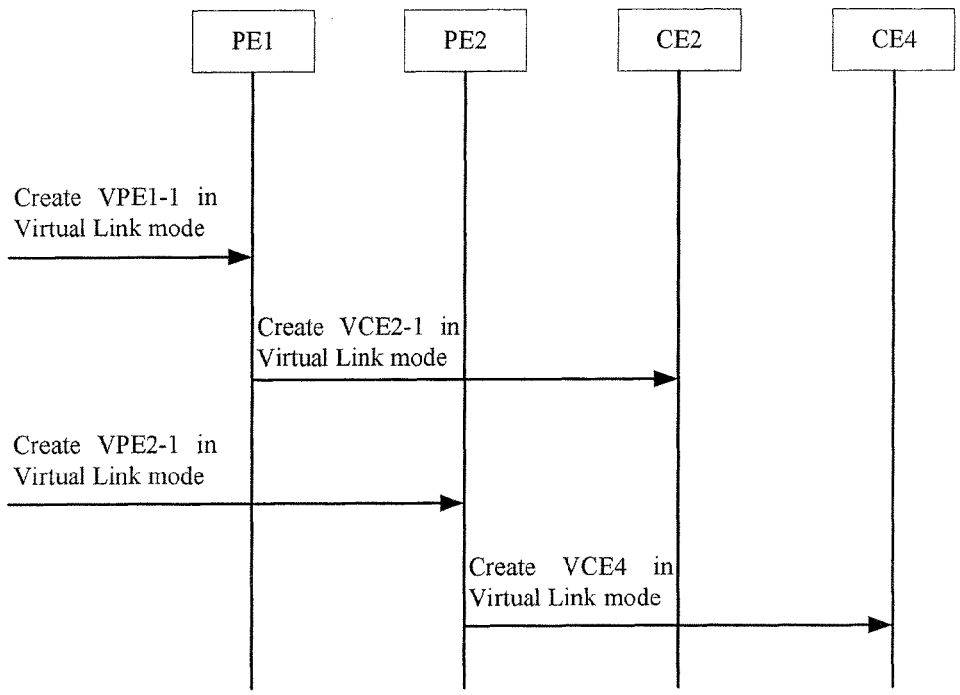
FIG. 4 is a schematic diagram of a procedure for creating a VPE and a VCE according to an embodiment of the invention.

Further descriptions of dynamic creation and deletion of a VCE and a VPE are given below in conjunction with FIGS. 3, 4 and 5. FIG. 4 illustrates a schematic diagram of a procedure for creating a VPE and a VCE including the following steps.

A PE1 creates a VPE1-1 upon receipt of a command to create a VPN1 using the Virtual Link mode.

A PE2 creates a VPE2-1 upon receipt of a command to create a VPN1 using the Virtual Link mode.

A CE2 creates a VCE2-1 upon receipt of a command to create a VPN1 using the Virtual Link mode.

A CE4 creates a VCE4 upon receipt of a command to create a VPN1 using the Virtual Link mode.

The above steps are not necessarily in a defined successive order. The command may be from a Virtual Private Network Manager (VPN Manager), in other words, the VPN Manager issues a command to create a VPE and a VCE to the PE and the CE respectively. Alternatively, the VPN manager may issue a command to build a VPE to the PE, and the PE in turn issues a command to create a VCE to the CE through an interface between the PE and the CE. Further, creation of the VPE and the VCE may also be accomplished through signaling between the PE and the CE.

Figure 5:
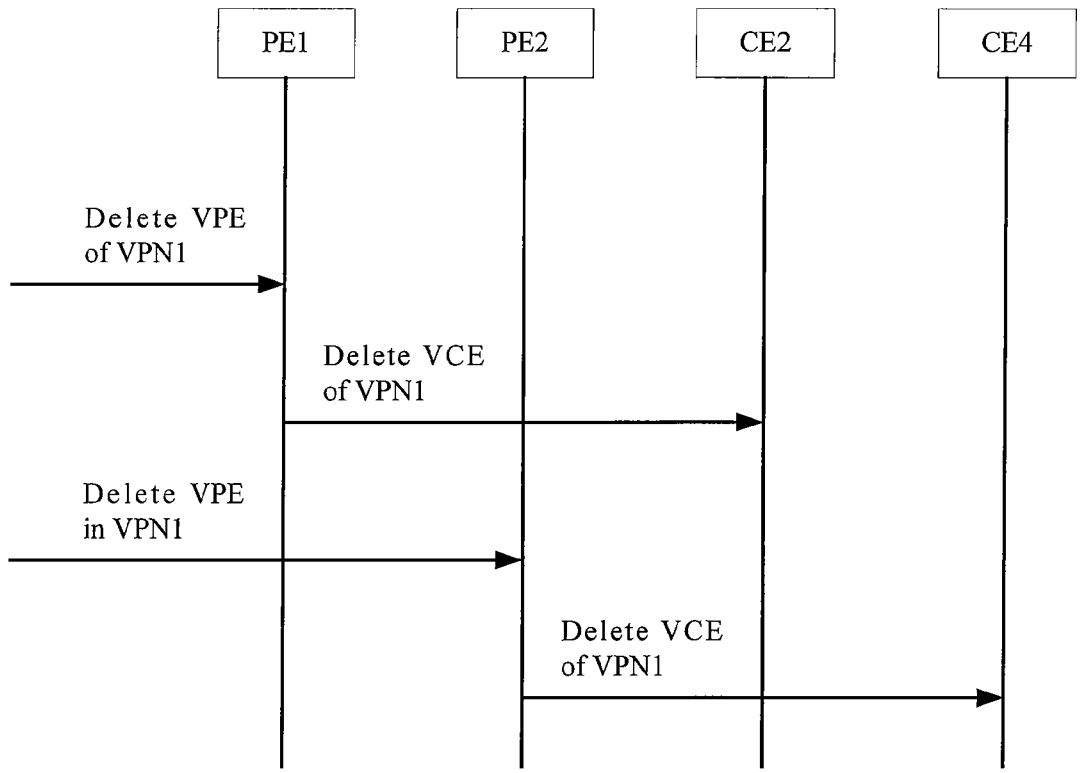
FIG. 5 is a schematic diagram of a procedure for deleting a VPN1 according to an embodiment of the invention.

FIG. 5 is a schematic diagram of a procedure for deleting the VPN1, including the following steps.

The PE1 deletes the corresponding VPE1-1 upon receipt of a command to delete the VPE corresponding to the VPN1.

The PE2 deletes the corresponding VPE2-1 upon receipt of a command to delete the VPE corresponding to the VPN1.

The CE2 deletes the corresponding VCE2-1 upon receipt of a command to delete the VCE corresponding to the VPN1.

The CE4 deletes the corresponding VCE4 upon receipt of a command to delete the VCE corresponding to the VPN1.

Likewise, the VPN2 using the Basic Mode can also be created and deleted.

After a VPE and a VCE are created, routing exchange and signaling exchange between them may be used to support an L1 VPN service. Specifically, the L1 VPN service can be implemented through the following two approaches.

Figure 6:
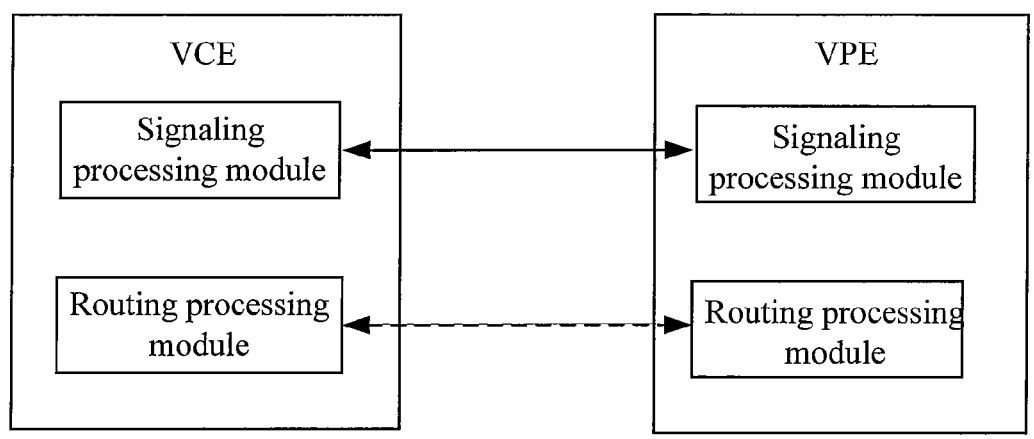
FIG. 6 shows a multi-service mode implementing an L1 VPN according to an embodiment of the invention.

A First Approach:

As shown in FIG. 6, both a VPE and a VCE have their own separate signaling part and routing part. Each of VPEs or VCEs on each PE or CE is a separate entity provided with a separate signaling processing module and a separate routing processing module. There is no shared part among the signaling processing modules or routing processing modules regardless of whether the VPEs and VCEs are of the same type of service mode.

Presence of routing information exchange between routing processing modules of the VPE and the VCE is dependent upon the type of a service mode. There is no routing information exchange in the case of the Basic Mode, but there is routing information exchange in the case of the Enhanced Mode.

Setting up, maintaining and deleting of an L1 VPN service is accomplished through signaling exchange between signaling processing modules of the VPE and the VCE.

A Second Approach:

For the same type of service modes, a uniform service mode instance for processing a common part of signaling and routing in the same type of service mode may be created on a CE and a PE. Each of VCEs and VPEs interacts with a service mode instance according to the service mode to which it belongs.

Figure 7:
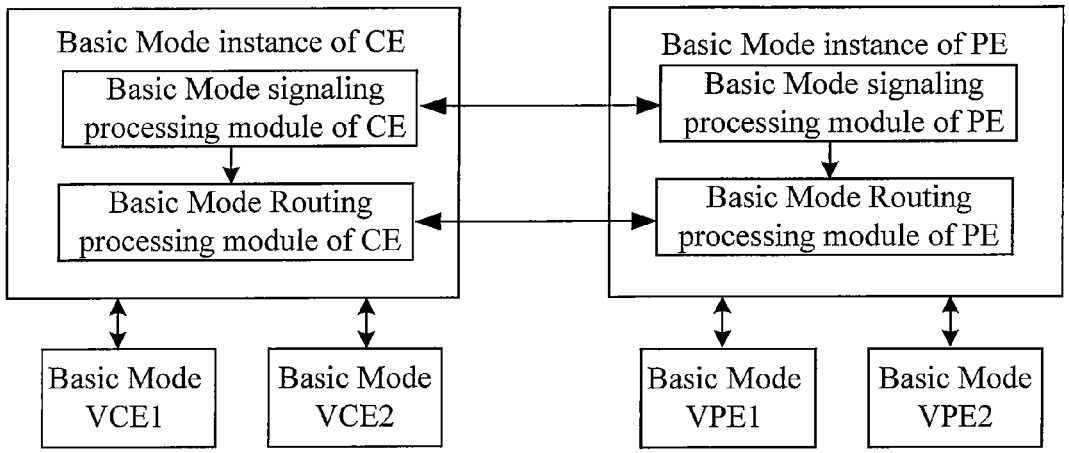
FIG. 7 is a multi-service mode implementing an L1 VPN according to another embodiment of the invention.

In an example of the Basic Mode, as illustrated in FIG. 7, two Basic Mode L1 VPNs are supported on a PE, and two Basic Mode L1 VPNs are supported on a CE. Here, a Basic Mode instance of PE is created on the PE, and includes a Basic Mode signaling processing module of PE and a Basic Mode routing processing module of PE; and a Basic Mode instance of CE is created on the CE, and includes a Basic Mode signaling processing module of CE and a Basic Mode routing processing module of CE.

Each of the VPEs and VCEs corresponding to the Basic Mode L1 VPN includes no signaling processing part or routing processing part, but only maintains information on its members. Maintenance of the information is accomplished through interaction with the Basic Mode instance of PE and the Basic Mode instance of CE. The Basic Mode signaling processing module of CE and the Basic Mode signaling processing module of PE perform signaling exchange to set up, maintain and delete a service in the L1 VPN.

Figure 8:
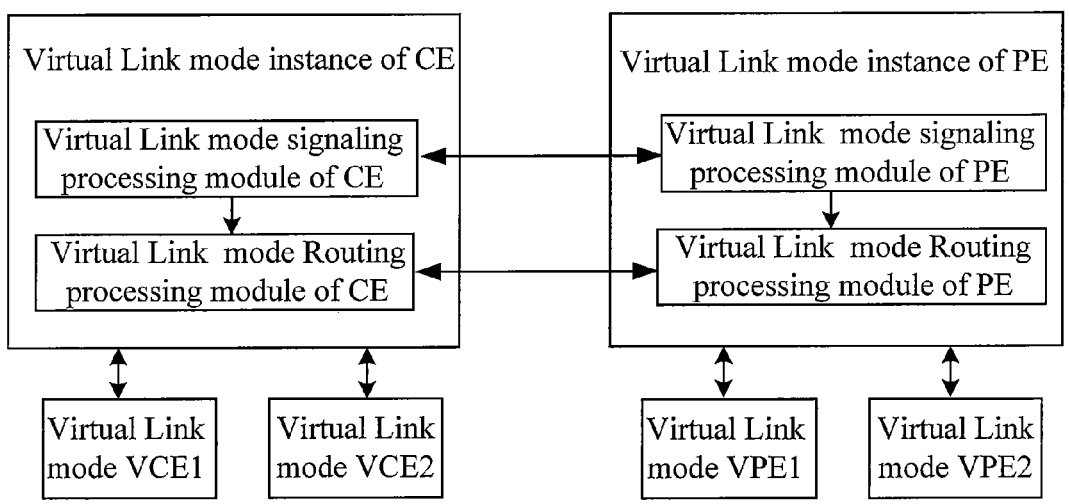
FIG. 8 is a multi-service mode implementing an L1 VPN according to a still another embodiment of the invention.

By way of an example of the Virtual Link mode among the Enhanced Modes, as illustrated in FIG. 8, two L1 VPNs in the Virtual Link mode are supported on a PE, and two L1 VPNs in the Virtual Link mode are supported on a CE. Here, a Virtual Link mode instance of PE is created on the PE, and includes a Virtual Link mode signaling processing module of PE and a Virtual Link mode routing processing module of PE; and a Virtual Link mode instance of CE is created on the CE, and includes a Virtual Link mode signaling processing module of CE and a Virtual Link mode routing processing module of CE.

Each of the VPEs and VCEs corresponding to the L1 VPN in the Virtual Link mode includes no signaling processing part or routing processing part, but only maintains information on its members. Maintenance of the information is accomplished through interaction with the Virtual Link mode instance of PE and the Virtual Link mode instance of CE. The Virtual Link mode signaling processing module of CE and the Virtual Link mode signaling processing module of PE perform signaling exchange to set up, maintain and delete a service in the L1 VPN. Also, the Virtual Link mode routing processing module of CE and the Virtual Link mode routing processing module of PE perform routing information exchange to accomplish functions of routing maintenance and management.

Generally, there is a low possibility of supporting a plurality of service modes on a physical CE. Consequently, only one service mode is typically supported on a CE. In other words, in the embodiments of the invention, it is not necessary for the CE to support a VCE, while a VPE is mostly supported on a PE.

Figure 9:
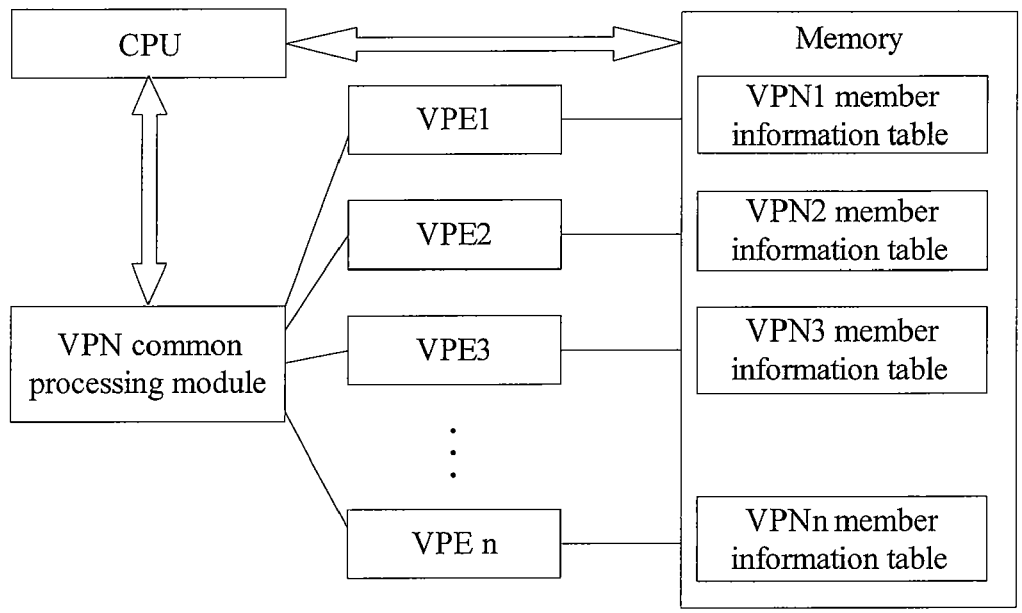
FIG. 9 is a schematic diagram of a PE supporting a VPE according to an embodiment of the invention.

FIG. 9 illustrates a PE supporting a VPE according to an embodiment of the invention, which includes a VPN common processing module, at least one VPE, a memory and a Central Processing Unit (CPU).

The VPN common processing module is adapted to implement common functions for the L1 VPN on a PE, such as automatic discovery, policy configuration, creation and deletion of a VPE, reception of a command issued from a VPN manager and distribution of the command to a corresponding VPE. The memory is adapted to store information on current VPN members in the form of a member information table. The member information can be retrieved through an automatic inquiry, and each VPE is associated with a VPN member information table of the VPN corresponding to this VPE. The CPU is adapted to implement VPN functions on the PE by interacting with the VPN common processing module according to content stored in the memory. The structure of the VPE has been described above, and therefore its detailed description will not be given herein. It will be appreciated that two different cases for the structure of the VPE may be present as illustrated in FIG. 6, and FIG. 7 and FIG. 8.

Figure 10:
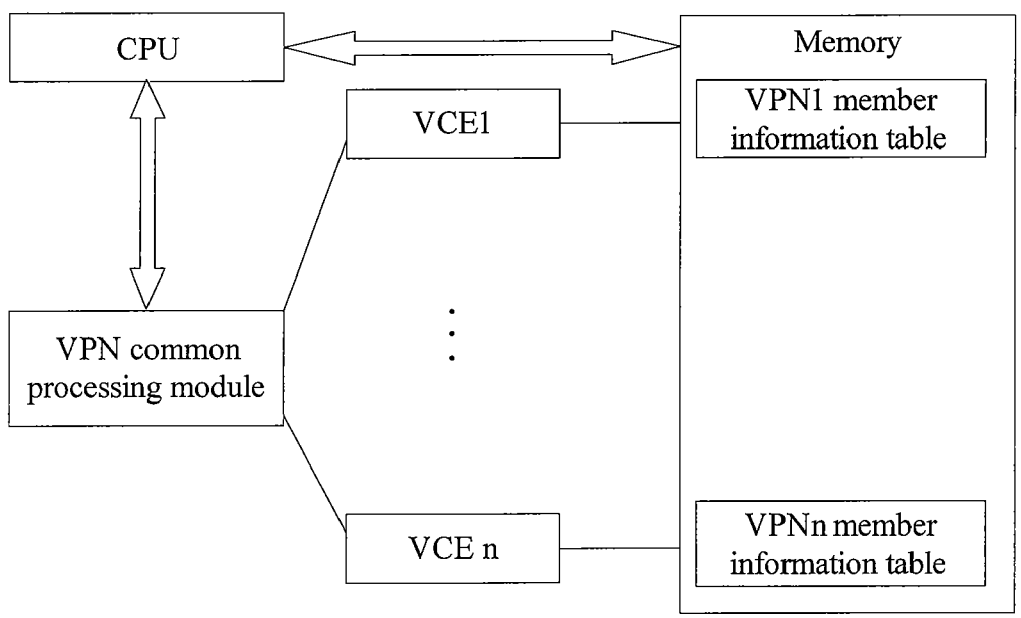
FIG. 10 is a schematic diagram of a CE supporting a VCE according to an embodiment of the invention.

FIG. 10 illustrates a CE device supporting a VCE according to an embodiment of the invention, which includes a VPN common processing module, at least one VPE, a memory and a Central Processing Unit (CPU).

The VPN common processing module is adapted to implement common functions for VPN on a CE, such as policy configuration, creation and deletion of a VCE, reception of a command issued by the VPN manager, distribution of the command to a corresponding VCE. The memory is adapted to store information on current VPN members in the form of a member information table. The member information can be retrieved through an automatic inquiry, and each VCE is associated with a VPN member information table of the VPN corresponding to this VCE. The CPU is adapted to implement VPN functions on the CE by interacting with the VPN common processing module according to content stored in the memory. The structure of the VCE has been described above, and therefore its detailed description is not given herein. It will be appreciated that two different cases for the structure of the VCE may be present as illustrated in FIGS. 6, 7 and 8.

In the embodiments of the invention, appropriate service modes may be selected according to different demands of a user for L1 VPN services required, and VPEs and VCEs may be created dynamically on a PE and a CE to support various service modes, so as to satisfy the demands of the user. Information of the VCE and the VPE of a VPN is isolated from that of the VCE and the VPE of a different VPN, information security and effective resource usage can be ensured in supporting the various service modes.

It will be appreciated by those skilled in the art that all or part of the modules or the respective steps in the above embodiments can be implemented through a program in connection with relevant hardware. The program may be stored in a computer readable storage medium such as ROM/RAM, a floppy disk and an optical disk. Alternatively, the modules or the steps may be respectively implemented as respective integrated circuit modules, or a plurality of modules or steps among them may be implemented as a single integrated circuit module. Accordingly, the invention will not be limited to any specific combination of hardware and software.

The above are merely illustrative embodiments of the invention, but the scope of the invention shall not be limited to these. Variations or substitutions which will readily occur to those skilled in the art without departing from the disclosure of the invention shall be encompassed in the scope of the invention.

The invention claimed is:

1. A method for implementing a Layer 1 Virtual Private Network (L1 VPN), comprising:
    creating on a Provider Edge (PE) at least one Virtual PE, wherein the Virtual PEs belonging to the same type of service mode have a uniform PE service mode instance, creating on a Customer Edge (CE) at least one Virtual CE, wherein the Virtual CEs belonging to the same type of service mode have a uniform CE service mode instance, the Virtual PEs belonging to the same type of service mode perform uniformly signaling exchange and routing exchange with the Virtual CEs through a signaling processing module and a routing processing module of the PE service mode instance to support a first at least one L1VPN service mode, the Virtual CEs belonging to the same type of service mode perform uniformly signaling exchange and routing exchange with the Virtual PEs through a signaling processing module and a routing processing module of the CE service mode instance to support a second at least one L1 VPN service mode, the Virtual PE maintains members information of the L1 VPN corresponding to the Virtual PE, and the Virtual CE maintains members information of the L1 VPN corresponding to the Virtual CE.

2. The method according to claim 1, wherein the creating on the PE the at least one Virtual PE comprises:
    creating, by the PE, the at least one Virtual PE corresponding to the first at least one L1 VPN service mode upon receipt of a command to create the first at least one L1 VPN service mode.

3. The method according to claim 1, wherein the creating on the CE the at least one Virtual CE comprises:
    creating, by the CE, the at least one Virtual CE corresponding to the second at least one L1 VPN service mode upon receipt of a command to create the second at least one L1 VPN service mode.

4. The method according to claim 1, further comprising:
    deleting the Virtual PE corresponding to the first at least one L1 VPN service mode upon deletion of the first at least one L1 VPN service mode.

5. The method according to claim 1, further comprising:

deleting the Virtual PE and the Virtual CE corresponding to the second at least one L1 VPN service mode upon deletion of the second at least one L1 VPN service mode.

6. A Provider Edge for implementing a Layer 1 Virtual Private Network, comprising a VPN common processing module, at least one Virtual PE, a memory and a Central Processing Unit, wherein: the VPN common processing module implements common functions for at least one L1 VPN service mode, and create or delete the at least one Virtual PE corresponding to the at least one L1 VPN service mode; wherein the Virtual PEs belonging to the same type of service mode have a uniform PE service mode instance, the Virtual PEs belonging to the same type of service mode perform uniformly signaling exchange and routing exchange with the Virtual CEs through a signaling processing module and a routing processing module of the PE service mode instance to support a first at least one L1 VPN service mode, wherein the Virtual CEs are created on at least one CE, Virtual PE maintains members information of the L1 VPN corresponding to the Virtual PE; the memory stores member information of the at least one L1 VPN service mode; and the Central Processing Unit interacts with the VPN common processing module according to the member information stored in the memory to support the at least one L1 VPN service mode.

7. A Customer Edge for implementing a Layer 1 Virtual Private Network, comprising a VPN common processing module, at least one Virtual CE, a memory and a Central Processing Unit, wherein: the VPN common processing module implements common functions for at least one VPN service mode, and create or delete the at least one Virtual CE corresponding to the at least one L1 VPN service mode, wherein the Virtual CEs belonging to the same type of service mode have a uniform CE service mode instance, the Virtual CEs belonging to the same type of service mode perform uniformly signaling exchange and routing exchange with the Virtual PEs through a signaling processing module and a routing processing module of the CE service mode instance to support a second at least one L1 VPN service mode, wherein the Virtual PEs are created on at least one PE, the Virtual CE maintains members information of the L1 VPN corresponding to the Virtual CE; the memory stores member information of the at least one L1 VPN service mode; and the Central Processing Unit interacts with the VPN common processing module according to the member information stored in the memory to support the at least one L1 VPN service mode.

* * * * *